United States Patent
Alon et al.

(10) Patent No.: US 7,961,594 B2
(45) Date of Patent: Jun. 14, 2011

(54) METHODS AND SYSTEMS FOR HISTORY ANALYSIS FOR ACCESS PATHS IN NETWORKS

(75) Inventors: Roee Alon, Boston, MA (US); Assaf Levy, Boston, MA (US); Shai Scharf, Boston, MA (US); Raphael Yahalom, Needham, MA (US)

(73) Assignee: Onaro, Inc., Boston, MA (US)

( * ) Notice: Subject to any disclaimer, the term of this patent is extended or adjusted under 35 U.S.C. 154(b) by 885 days.

(21) Appl. No.: 11/112,942

(22) Filed: Apr. 22, 2005

(65) Prior Publication Data
US 2005/0262233 A1 Nov. 24, 2005

Related U.S. Application Data (63) Continuation-in-part of application No. 10/693,632, filed on Oct. 23, 2003, now Pat. No. 7,617,320.

(60) Provisional application No. 60/420,644, filed on Oct. 23, 2002, provisional application No. 60/564,837, filed on Apr. 23, 2004, provisional application No. 60/565,064, filed on Apr. 23, 2004.

(51) Int. Cl.
*G01R 31/08* (2006.01)
(52) U.S. Cl. .. 370/216; 370/242; 370/248; 707/999.202
(58) Field of Classification Search .................. 370/244, 370/351, 401, 216, 242, 248; 707/999.202
See application file for complete search history.

(56) References Cited

U.S. PATENT DOCUMENTS

| | | | |
|---|---|---|---|
| 5,452,448 A | 9/1995 | Sakuraba et al. | |
| 5,774,377 A * | 6/1998 | Eidson et al. | 702/187 |
| 5,825,772 A | 10/1998 | Dobbins et al. | |
| 5,940,819 A | 8/1999 | Beavin et al. | |
| 6,223,176 B1 | 4/2001 | Ricard et al. | |
| 6,233,240 B1 * | 5/2001 | Barbas et al. | 370/395.62 |
| 6,240,463 B1 * | 5/2001 | Benmohamed et al. | 709/238 |
| 6,327,598 B1 | 12/2001 | Kelley et al. | |
| 6,347,335 B1 * | 2/2002 | Shagam et al. | 709/223 |
| 6,434,626 B1 * | 8/2002 | Prakash et al. | 709/238 |
| 6,636,981 B1 | 10/2003 | Barnett et al. | |
| 6,691,169 B1 | 2/2004 | D'Souza | |
| 6,751,228 B1 | 6/2004 | Okamura | |
| 6,792,503 B2 | 9/2004 | Yagi et al. | |

(Continued)

FOREIGN PATENT DOCUMENTS

WO WO 01/82077 11/2001

(Continued)

OTHER PUBLICATIONS

Using idle disks in a cluster as a high-performance storage system; JS Hansen—Cluster Computing, 2002.*

(Continued)

*Primary Examiner* — Salman Ahmed (57) ABSTRACT

A method and system for constructing and analyzing an access path event history in a network is provided. Inconsistencies in the physical and logical access paths when making changes in the network are detected and analyzed. Component events associated with network appliances are recorded and an event sequence is constructed. Root causes for the inconsistencies are identified and the access paths are repaired in conformance with the network access path policy. The method and systems can be applied to networks in general, and more particularly to storage area networks (SAN).

12 Claims, 4 Drawing Sheets

U.S. PATENT DOCUMENTS

| | | | |
|---|---|---|---|
| 6,795,399 B1* | 9/2004 | Benmohamed et al. | 370/235 |
| 6,816,927 B2 | 11/2004 | Bouchet | |
| 6,904,143 B1* | 6/2005 | Peterson et al. | 379/265.01 |
| 6,909,700 B1* | 6/2005 | Benmohamed et al. | 370/255 |
| 6,985,937 B1 | 1/2006 | Keshav et al. | |
| 6,990,520 B2 | 1/2006 | Green et al. | 709/223 |
| 7,051,029 B1* | 5/2006 | Fayyad et al. | 707/10 |
| 7,054,782 B2* | 5/2006 | Hartlaub | 702/138 |
| 7,058,702 B2 | 6/2006 | Hogan | |
| 7,062,559 B2 | 6/2006 | Yoshimura et al. | |
| 7,069,480 B1* | 6/2006 | Lovy et al. | 714/57 |
| 7,103,653 B2 | 9/2006 | Iwatani | |
| 7,103,712 B2 | 9/2006 | Mizuno | |
| 7,120,654 B2 | 10/2006 | Bromley | |
| 7,127,633 B1* | 10/2006 | Olson et al. | 714/4 |
| 7,149,886 B2 | 12/2006 | Fujibayashi et al. | |
| 7,194,538 B1 | 3/2007 | Rabe et al. | |
| 7,260,628 B2* | 8/2007 | Yamamoto et al. | 709/224 |
| 7,284,244 B1* | 10/2007 | Sankaranarayan et al. | 718/104 |
| 7,340,646 B2* | 3/2008 | Haustein et al. | 714/20 |
| 7,376,937 B1* | 5/2008 | Srivastava et al. | 717/128 |
| 7,380,239 B1* | 5/2008 | Srivastava et al. | 717/128 |
| 7,493,350 B2* | 2/2009 | Episale et al. | 1/1 |
| 7,512,954 B2* | 3/2009 | Srivastava et al. | 719/318 |
| 7,546,333 B2* | 6/2009 | Alon et al. | 709/200 |
| 7,617,320 B2* | 11/2009 | Alon et al. | 709/229 |
| 7,640,267 B2* | 12/2009 | Spivack et al. | 1/1 |
| 7,702,667 B2* | 4/2010 | Yahalom et al. | 707/611 |
| 7,774,365 B2* | 8/2010 | Oxenstierna et al. | 707/783 |
| 2002/0145981 A1* | 10/2002 | Klinker et al. | 370/244 |
| 2003/0005119 A1 | 1/2003 | Mercier et al. | |
| 2003/0018619 A1* | 1/2003 | Bae et al. | 707/3 |
| 2003/0101258 A1 | 5/2003 | Parham | |
| 2003/0191992 A1* | 10/2003 | Kaminsky et al. | 714/712 |
| 2003/0208589 A1 | 11/2003 | Yamamoto | |
| 2004/0030739 A1 | 2/2004 | Yousefi'zadeh | |
| 2004/0030768 A1* | 2/2004 | Krishnamoorthy et al. | 709/223 |
| 2004/0075680 A1* | 4/2004 | Grace et al. | 345/734 |
| 2004/0205089 A1 | 10/2004 | Alon et al. | |
| 2004/0215749 A1 | 10/2004 | Tsao | |
| 2004/0243699 A1 | 12/2004 | Koclanes et al. | |
| 2005/0010682 A1 | 1/2005 | Amir et al. | |
| 2005/0097471 A1* | 5/2005 | Faraday et al. | 715/723 |
| 2005/0114403 A1 | 5/2005 | Atchison | |
| 2005/0160431 A1* | 7/2005 | Srivastava et al. | 719/313 |
| 2006/0004830 A1 | 1/2006 | Lora et al. | |
| 2006/0143492 A1* | 6/2006 | LeDuc et al. | 714/2 |
| 2006/0161883 A1 | 7/2006 | Lubrecht et al. | |
| 2006/0161884 A1 | 7/2006 | Lubrecht et al. | |
| 2006/0218366 A1 | 9/2006 | Fukuda et al. | |
| 2007/0088763 A1 | 4/2007 | Yahalom et al. | |
| 2007/0094378 A1* | 4/2007 | Baldwin et al. | 709/223 |
| 2007/0198722 A1 | 8/2007 | Kottomtharayil et al. | |

FOREIGN PATENT DOCUMENTS

| | | |
|---|---|---|
| WO | WO 02/088947 A2 | 11/2002 |
| WO | WO 03/054711 A1 | 7/2003 |
| WO | WO-2004/111765 | 12/2004 |
| WO | WO 2004/111765 | 12/2004 |

OTHER PUBLICATIONS

Scalable and Manageable Storage Systems (CMU-CS-00-178) KS Amiri—Parallel Data Laboratory, 2000.*

On the interconnection topology for storage area networks; Molero, X.; Sills, F.; Santonja, V.; Duato, J.; Parallel and Distributed Processing Symposium., Proceedings 15th International 2001.*

Using idle disks in a cluster as a high-performance storage system; Hansen, J.S.; Lachaize, R.; Cluster Computing, 2002. Proceedings. 2002 IEEE International Conference.*

* cited by examiner

METHODS AND SYSTEMS FOR HISTORY ANALYSIS FOR ACCESS PATHS IN NETWORKS

CROSS-REFERENCE TO OTHER PATENT APPLICATIONS

This application is a continuation-in-part of U.S. patent application Ser. No. 10/693,632, filed Oct. 23, 2003, which claims the benefit of U.S. Provisional Patent Application No. 60/420,644, filed Oct. 23, 2002. This application also claims the benefit of U.S. Provisional Patent Applications No. 60/564,837 and 60/565,064, both filed Apr. 23, 2004, the contents of all of which are incorporated herein by reference in their entirety.

BACKGROUND OF THE INVENTION

Data networks are employed to transmit messages and data from a network appliance which initiates a network event, such as a query or a data transfer, subsequently also referred to as an initiator, application, server or host, to another network appliance which can respond to the event, for example, a data storage device. In various types of networks, for example in Storage Area Networks (SAN), defined access paths between the network appliances, may have to conform to an access path policy. The defined access paths are physical and logical pathways, which can include the initiators, their particular components and ports, such as Host Bus Adapters (HBA), a switch fabric with switches, routers and the like, and end devices, such as physical storage devices, containing Logical Unit Numbers (LUN). The state of each of the components has to be properly logically configured to enable appropriate flow along the pathway. In addition, the physical pathways typically have to comply with a policy, also referred to as access path policy, which includes policy attributes, such as path redundancy, path connectivity characteristics, and the like.

One example of a data network with defined logical access path is a storage area network which enables multiple applications on servers access to data stored in consolidated, shared storage infrastructures. Enterprises increasingly deploy large-scale, complex networks to gain economies-of-scale business benefits, and are performing and planning extensive business-critical migration processes to these new environments.

Data networks are constantly undergoing changes, upgrades and expansion, which increases their complexity. The number of components and links which may be associated with the data transfer between a given initiator and one or more of its data network appliances may increase exponentially with the size of the network.

This complexity, which is compounded by the heterogeneity of the different network devices, leads to high risk and inefficiency. Changes to the network, which can happen frequently, may take a long time to complete by groups of network managers, and are error-prone. For example, in many existing enterprises a routine change, such as adding a new server to a network, may take 1-2 weeks to complete, and a high percentage (sometime 30-40%) of these change processes include at least one error. It is estimated that around 80% of enterprise outage events are a result of events related to changes in the network infrastructure.

To implement the access relationships and related access characteristics, multiple underlying devices of different types and related physical/logical access paths between these devices need to be set up. The physical and logical set-up can include multiple actions (sometime tens per a single logical change), which need to be set up at different locations and with device types, with perfect mutual consistency.

It would therefore be desirable to detect inconsistencies in the physical and logical access paths when making changes in the network, to analyze these inconsistencies and to find the root causes for the inconsistencies between the changed access path and the access path policy for the network.

SUMMARY OF THE INVENTION

The invention addresses the deficiencies in the prior art by, in various embodiments, providing methods and systems for constructing and analyzing logical access path histories in a network. Time-based sequences of consistent global snapshots of the network are constantly constructed and maintained for future reference. A consistent global snapshot of a network is a representation which correctly reflects the actual status of all of the end-to-end access paths in the network at a particular point in time that are consistent with or conform to a defined network access path policy. The network access path policy specifies which access paths in the network between an initiator, such as an application in a SAN, and a data appliance, such as a LUN in a SAN storage appliance, should not exist, which should exist, and what should be the end-to-end attributes of each access path.

The status of each access path includes high level path attributes derived from the physical and logical characteristics of the components which provide the access relationship between a given initiator and a data appliance.

A management server automatically collects information about events and from devices distributed across the network using a variety of non-intrusive mechanisms. It identifies violations of actual access paths relative to the required access paths as determined by the policy. It provides notifications about violations, with all their relevant context information, to an appropriate target recipient. The management server, using network customized graph-based algorithms, analyzes the information and its impact on network access paths and compliance with the access path policy.

According to one aspect, the invention provides a process for constructing and analyzing an access path event history in a network, which includes detecting events of one or more components in the network, determining a logical order or a temporal order, or both, of the events; and generating an event sequence based on the logical or temporal order.

According to another aspect, the invention provides a process for constructing and analyzing an access path event history in a network, which includes detecting at least one event causing nonconformance with a network access path policy, determining a root cause for the nonconformance, reconfiguring network resources based on the root cause to bring the reconfigured network in conformance with the network access path policy, and validating the reconfigured network.

According to still another aspect, the invention provides a process for updating logical access paths in a network, which includes detecting at least one component event in the network, checking conformance of a configuration change caused by the at least one component event with a network access path policy, and if the configuration change is in conformance, validating the logical access path.

According to yet another aspect of the invention, a process for constructing and analyzing an access path event history in a network includes detecting nonconformance between an access path state and an access path policy, and determining at least one future change event which, if it occurs, will result in conformance of the network access paths with the access path policy. The conformance of the access paths can be validated after the change events have occurred.

According to still another embodiment of the invention, a network management system for managing access path in a network includes a components interaction engine receiving event information from network components, and an event correlation engine determining a logical or temporal order, or both, of events, and generating an event sequence based on the logical or temporal order.

Advantageous embodiments of the invention may include one or more of the following features. Detecting an event may involve obtaining physical and logical state parameters from the components in the network. An access path violation may be associated with a first event in the event sequence, with the first event representing a root cause for the access path violation. The root cause can be analyzed and a corrective action for the component causing the access path violation can be determined. For example, the root cause can be determined based on event timing and reconciling discrepancies in the event timing.

Event timing can include receiving from network components timestamps associated with the events. Reconciling discrepancies in the event timing may include determining a relative time order of the timestamps based on semantics of a timestamp, a route for transmission of a timestamp, a multiplicity of messages with different timestamps for an identical event, and a causal relationship between events. Alternatively or in addition, reconciling discrepancies may include correcting, or proposing corrective action for, logical/physical path connectivity of the network components to bring the reconfigured network in conformance with the network access path policy. Moreover, a logical access path associated with the event can be revised, if the event is caused by a logical access path that is not conforming to the access path policy.

Events and associated root causes related to nonconformance can be successively recorded and optionally collapsed into an updated access path representation. The recorded events and/or the collapsed access path representation can be visualized, for example, on a display.

One or more subsets of the events or of the network can be selected to provide a summary statistics of the events or a network status. The events can also be filtered so as to record state changes within a certain time interval, state changes affecting a specific component, or state changes impacting the access paths, or a combination thereof.

The network management system can include an information normalization engine for converting the received event information to a normalized, device-independent event representation, an information reconciliation engine for correcting or eliminating inconsistent event information received from network components, and/or a root cause analysis engine which associates a first event in the event sequence with an access path violation, said first event representing a root cause for the access path violation.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION

The methods and systems described herein enable multiple initiators on multiple network appliances, such as servers or applications, to access (read and write) data which is stored on multiple other shared network appliances, such as storage devices. Exemplary embodiments of the methods and systems will be described with reference to a SAN having specialized SAN devices (such as different types of switches) which are interlinked, and may employ various transfer protocols (such as Fibre Channel and iSCSI). Each server is connected to the network through one or more specialized network cards (such as a Host Bus Adapter, or HBA). Application data can be stored on a storage device in storage units called LUNs (LUN=Logical Unit Number). Although the invention will be scribed with reference to a SAN, a SAN is only one particular example of a network with defined physical and logical access paths and an associated access path policy, and it will be understood that the invention can be used with other types of networks, such as local area networks, wide area networks, extranets, remote-site connections, inter-domain networks, intranets, and possible the Internet, as long as access paths can be defined, set up, and monitored in such a network.

In the context of the invention, the following terminology will be used:

Access Path—a physical and logical connection or link between components in a network, which enables an initiator on one node of the network to access a data set on another node, while disabling other initiators from accessing the same data set, unless provisions are made for controlled sharing of the same data between several initiators. More particularly, when applied to the exemplary storage area network (SAN), the term Logical Access Path refers to a logical channel between a given application and a given LUN along which data can flow. The logical state (configuration state) of each component along the way in that sequence (for example the HBA, the storage controller, and each of the switches) is set so as not to disable data flow between that specific application and that specific LUN along that specific sequence of components.

Access Path Policy—specifies all the access paths that should exist, and required end-to-end properties for each of these access-path at any given point in time. For example, the access path policy can specify redundancy and replication of components and network appliances, number of hops, latency, constraints on component types inter-connections along the path, etc.

Access Path Event—a physical or logical change of a state of one of the components which are part of an access path. An access path event can be caused, for example, by a node failure, a faulty cable connection, or a change in a cable connection, or a zone configuration change.

Access Path Violation—a discrepancy at some point in time between the access path policy and the access paths in the network environment, which can be caused by an access path event and can be reflected, for example, in the existence/ absence of an access path or in a change in the properties of one or more of the existing access paths.

Figure 1:
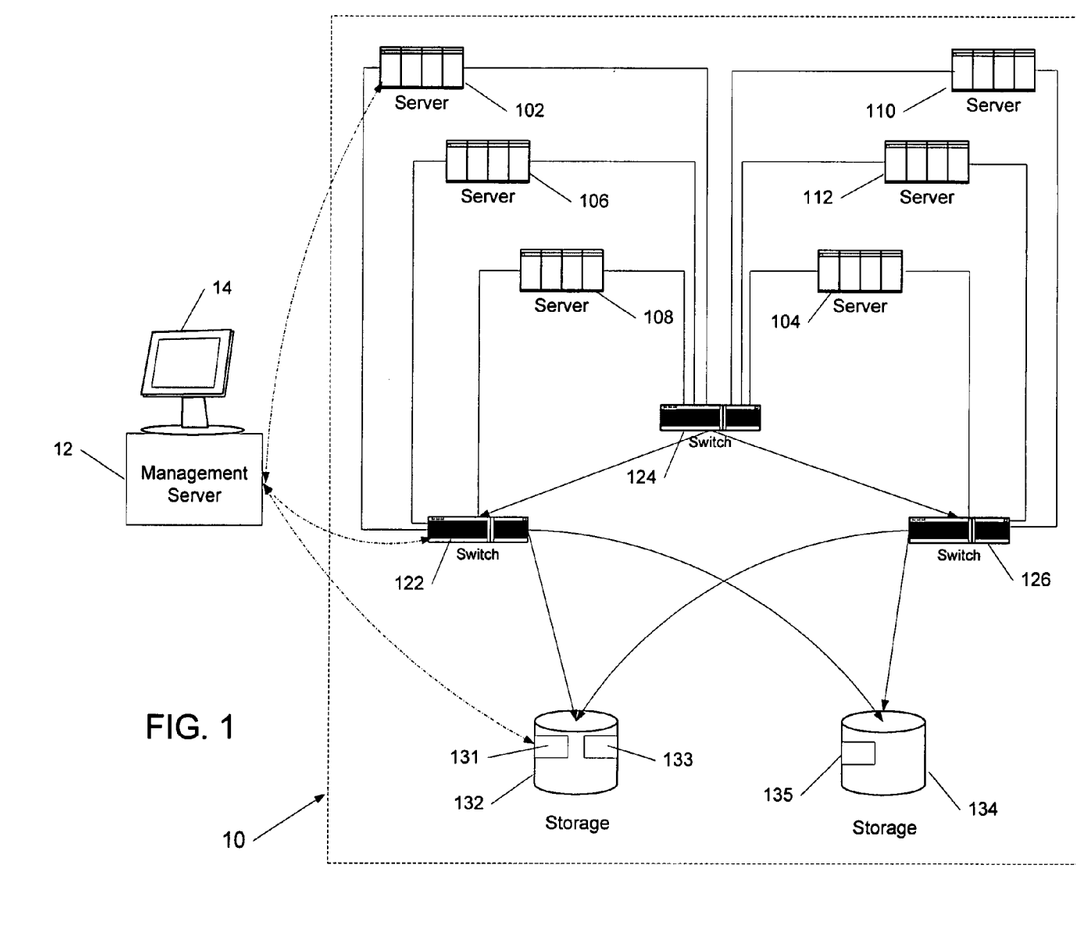
FIG. 1 shows a schematic diagram of an exemplary network with physical links and a management server according to the invention.

FIG. 1 shows a topological view of an exemplary network 10, such as a storage area network (SAN), with several network appliances, for example peripherals such as servers 102, 104, 106, 108, 110, 112, switches 122, 124, 126, and application data storage devices 132, 134. The storage devices can be, for example, disk drives, such as RAID devices, tape drives, or other types of mass-storage devices. The physical connection paths between different network appliances are indicated by solid lines. Not all physical access paths are also logical access paths, because some physical access paths alone or in combination with other access paths may have characteristics that cause nonconformance with the access path policy. The storage devices 132, 134 can be further partitioned into data storage regions, such as unique LUNs 131, 133, 135.

The network 10 of FIG. 1 includes a management server 12 which for the exemplary network 10 is configured to communicate with various network components, including the network appliances, i.e., the servers 102, 104, 106, ..., 112, the storage devices 132, 134 and respective LUNs 131, 133, 135, and switches 122, 124, 126, to monitor the network and network resources and assure conformance between the logical access paths and the access path policy. This communication can take place via the communication channels used by the network for data transfer or via separate communication channels.

Figure 2:
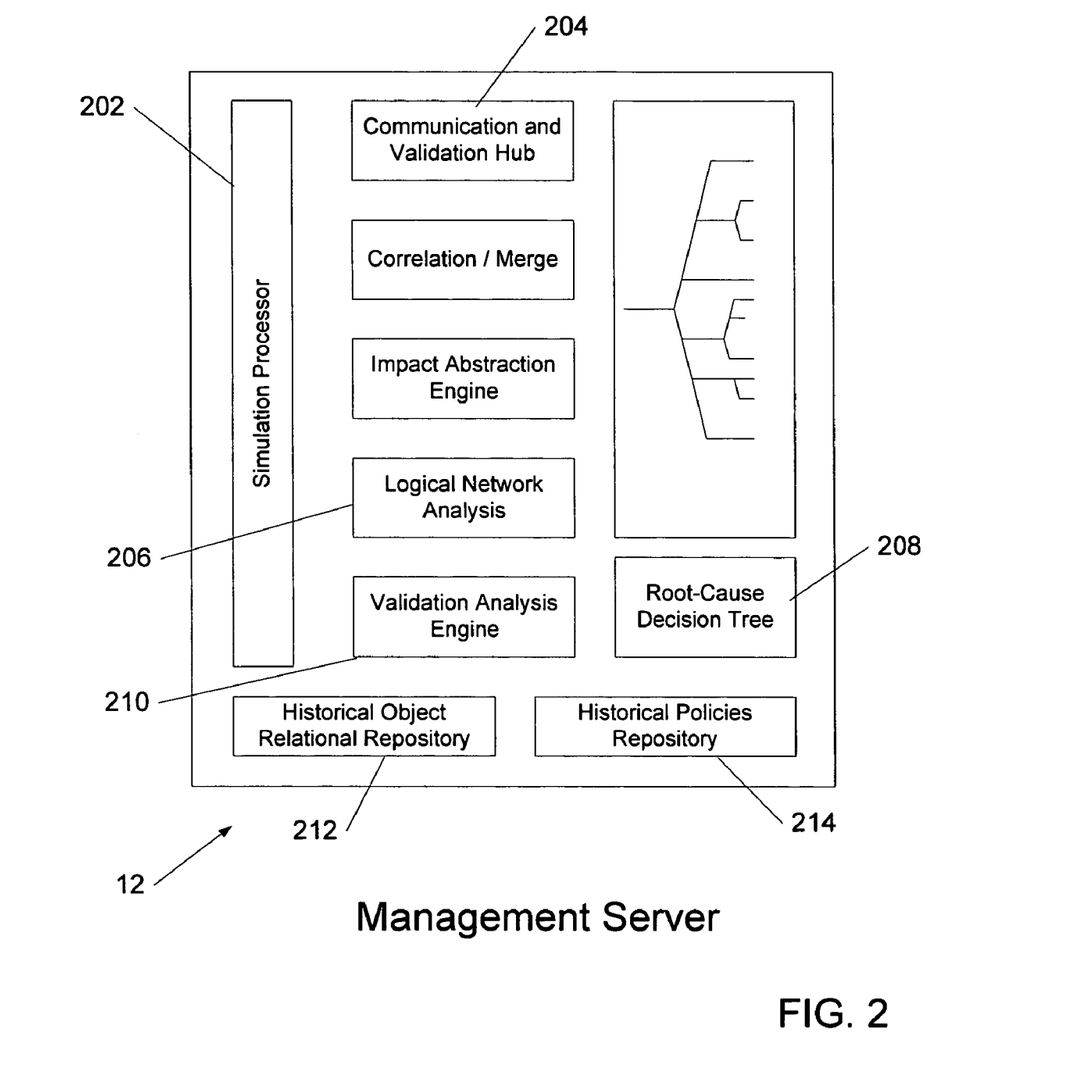
FIG. 2 shows details of the management server of FIG. 1.

FIG. 2 shows in more detail an exemplary configuration of the management server 12. The management server 12 can include, inter alia, a Components Interaction Engine 202 which obtains information from the various network components in a manner described above. An Information Normalization Engine 204 converts the obtained information to a standard, device-independent representation, with the Information Reconciliation Engine 206 reconciling conflicts, removing redundant information and identifying incomplete information. Event Correlation Engine 208 establishes relationships between events and establishes an temporal and logical event sequence. The Validation Analysis Engine 210 compares the actual access paths with the access path policy and identifies access path violations. History Analysis Engine 212 selects events, for example, based on their causal relationships, filters events according to defined filter criteria, and performs statistical and trending analysis. The Root Cause Analysis Engine 214 analyzes the root cause(s) of detected violations and can optionally generate a root cause decision tree 216. An Event Repository 218 stores access path violations, events leading to these violations, root causes, etc., whereas a Policy History Repository 220 stores access path policies and changes in the access path policies.

Figure 3:
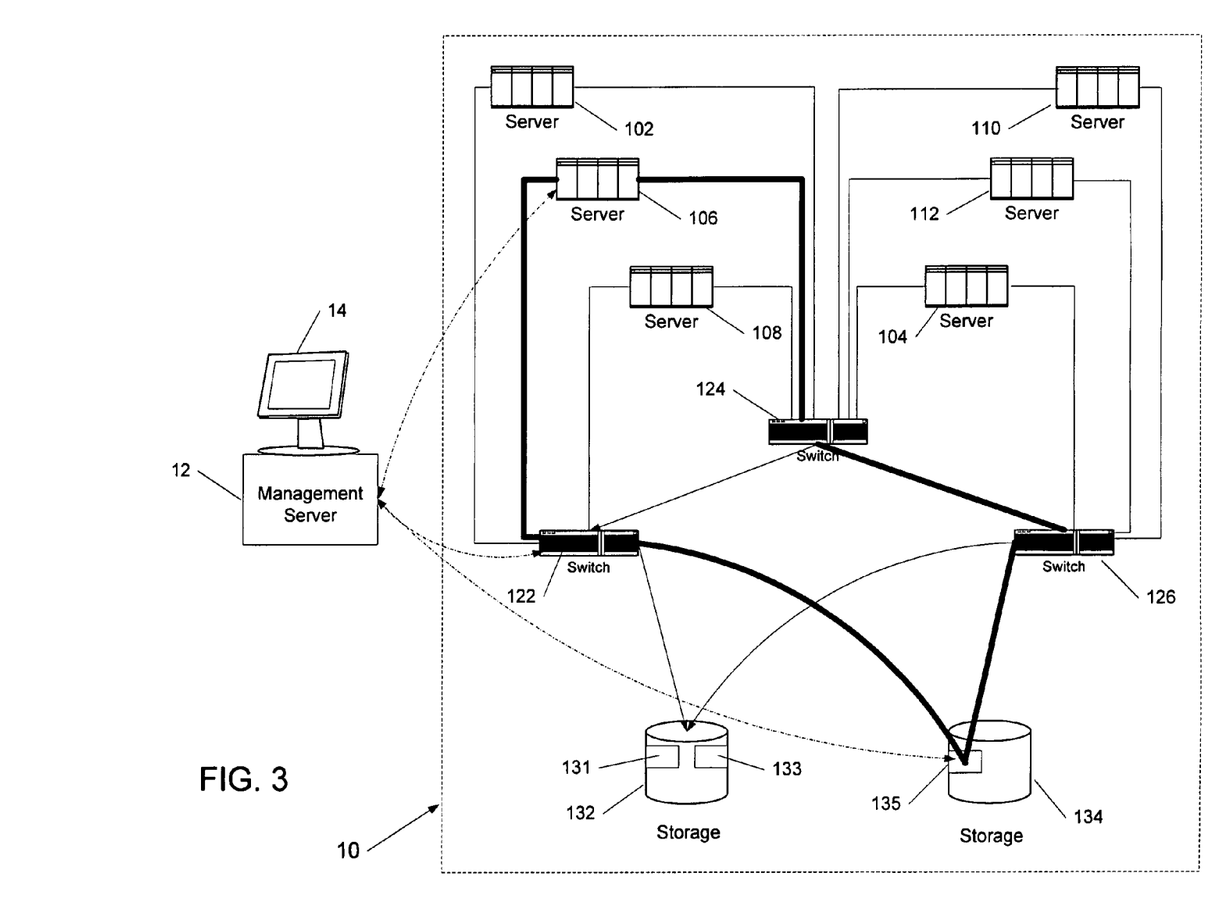
FIG. 3 shows two exemplary logical access path between a server and a storage device that comply with a network access path policy.

FIG. 3 depicts the exemplary network 10 with logical access paths (shown as bold lines) set up between a network appliance 106, such as a server or an application, and a LUN, such as LUN 135, on storage device 134. The intermediate components along the access path include, among others, intermediate nodes, such as switch 122 in one of the logical access paths, and switches 124, 126, in the other access path. It can be inferred from the network diagram of FIG. 3 that the access path policy requires redundant access paths. It will be understood that the illustrated network configuration serves as an example only, and that the configuration and routing of the access paths will depend on the type of device and number of devices employed at the network nodes (e.g., switches 122, 124, 126). Each network device may be set to logically constrain traffic flows through that device to specific respective end-points only (using different methods depending on the type of device and on the vendor). For example, each switch typically supports the definition of different type of zones which are sets of device ports between which data may flow via that switch. Storage devices typically support LUN masking which imposes constraints on the servers that may access a LUN. Similarly, a server's HBA (host bus adapter) typically supports types of LUN masking that constrain which LUNs can be accessed from that particular server.

Consequently, to enable a data flow end-to-end from a particular given initiator or application to a particular given data LUN, both physical constraints (at least one physical path must exist between the corresponding server and the corresponding storage LUN) and logical constraints (the zoning in each switch and the LUN masking at the HBA and storage device should be set so as not to disable data traffic between these end points) need to be satisfied in all the devices along that route.

For example, the logical setup on each of the two HBAs on server 106, the zone set up in each of the switches 122, 124, 126, as well as the LUN masking 135 at the storage device must be set to enable flows along each of these logical channels between these two end points 106 and 135. For example, the zoning on switch 122 needs to be defined such that the port corresponding to server 106 and the other port corresponding to the storage device of LUN 135 are in the same zone. Logical access paths can include associated path attributes which can be considered as particular properties that characterize each end-to-end Logical Access Path, describing, for example, aspects of availability, performance and security of each given end-to-end logical channel. In other words, given a particular logical access path, a particular value can be computed for each one of the defined attributes (that value represents a particular property value for that logical access path instantiation).

The computation of a particular attribute value for a given logical access path, also referred to as path attributes, can be based on information related to the sequence of linked components, as well as on information about the types and internal configuration states of any number of components contained in that logical access path. The path attributes represent the characteristics of the end-to-end data flow between an initiator and its data. The path attributes relate to, for example, levels of end-to-end availability, performance, and security, all of which characterize data flows along a logical access path.

Monitoring the performance and compliance of a network with defined logical paths requires monitoring network appliances to detect access path events, analyzing the access path events to detect access path violations, and constructing and maintaining an access path history of access path violations through a sequence of end-to-end path snapshots of the access paths. These snapshots may have divergent and/or contradicting information and further information about the temporal and/or logical sequence of events may hence be required. Discrepancies requiring reconciliation may be due to:

- Multiple devices of different types with a variety of interface protocols
- Different information contents from different component sources
- Different information representation formats and methods
- Different level of reliability of devices
- Different clock settings
- Varying information flow time delays
- Missing information due to failures of components and links Returning to the exemplary network 10 depicted in FIG. 3, status information received from a variety of distributed sources, such as server 106, switch 122 and LUN 135, is processed at a central server, such as the network management server 12. Each such status information received from a component is parsed and translated from the source-specific and protocol-specific context representation to a normalized representation designed to capture device- and protocol-independent access path status information. Normalization is desired because, depending on the component type and the actual protocol used to communicate with the component, the information received from each component has a different syntactic and semantic representation, as well as variations in the information contents.

Normalization takes into account, among others:
component identity
component type and model
component software version
component physical connectivity
component configuration information (representing logical connectivity constraints)
component information about other components.

Status information can be received from each component source, either as an update response to a request or as a pre-defined, optionally periodically transmitted, component status update message. Each status update can contain a summary of the current state of the component, or information about a new component event that occurred at that component or at other parts of the network. For example, the switch 124 in network 10 may have failed, disabling one of the redundant access paths between server 106 and LUN 135, so that the logical access path between these two network appliances is no longer in compliance with the access path policy of the network 10 which requires redundancy. Similarly, access path policy may specify level storage redundancy and data redundancy (not shown).

As mentioned above, the physical connectivity information may include the identity of other components which are connected to this component's ports. The logical connectivity information may include various types of information flow constraints through the component, such as zoning, port binding, LUN masking, and the like.

The normalization process involves mapping the component-specific status information into an access path context paradigm. That is, deducing from the status of a component (physical and logical constraints) which access paths (potential data flows, from certain sources to certain destinations) are enabled or disabled by this specific component.

For example, a "device down" event (for example, inferred when no status response is received within a certain time after a request) may indicate that no data can currently be transmitted through the device. A "link down" event from a component may indicate that no data flow can currently be transmitted through a particular port of that component. A "soft zone update" event from a component (e.g. switch) may imply that data can only flow between network appliances in a new zone configuration. A "LUN masking update" event from a component (e.g. a storage device) may imply that data can only flow between a specified source in the new LUN masking configuration to the corresponding destination storage LUN.

The normalized representation of component status information can then be aggregated consistently, as will be described below, to determine the status of all the access paths in the network at any point in time. Moreover, the information received from the various distributed components about local component events, such as their temporal and logical order, can be processed by the management server 12 to determine an event sequence of these events.

Determining the sequential ordering of the underlying distributed events may not be straightforward for various reasons. For example, some event information may not contain timestamps, or timestamps from different sources may have different semantics, or clocks of different distributed sources may not be fully synchronized. Alternatively or in addition, timestamps from different sources may represent time of message generation (or transmission) rather than time of a specific underlying event, or messages from different distributed sources may incur different levels of transmission delays, or event information from various sources may be duplicated or partially duplicated, or, due to transmission failure or misrouting, messages may become reordered or lost.

The management server 12 analyzes the messages received from each component and determines the "correct" event sequence, i.e., the relative time order or timeline of the underlying events based on:

The semantics of the timestamp in the message as determined by the type of the source device and the nature of the interaction protocol between the central server and the source device. For example, in a switch that transmits, in response to a polling request, the updated zone configuration state, any specific new zone change event must be associated with a time point between the current snapshot time and the previous snapshot time for that switch.

The characteristics of the route between the source device and the central server. For example, a component event message from a component connected to the central server via a direct local-area channel is likely generated at a more predictable recent point in time than an event message transmitted via a number of network hops.

Elimination of multiple messages representing the same underlying event. For example, two different components may generate separate messages related to the same failure event. For example, a port failure at switch 124 may cause messages from both switch 124 and switch 126.

Assessment of causal relationships between different events. For example, a zone configuration change in one switch in a fabric can trigger a propagation of corresponding update events at other switches in that fabric. In other words, the update events at the other switches are causally dependent on the configuration change in the first switch and therefore occur after the original event, i.e., the configuration change. In another example, disconnection of a cable from one port must have occurred before reconnection of the same cable to another port.

The aforedescribed exemplary steps are only illustrative and by no means exhaustive. The temporal event order taken together with the logical event order make it possible to create a causal and consistent representation of an event sequence of multiple component events in the order in which the events actually occurred in the network.

The management server 12 analyzes the consistent event sequence representation and maps the event sequence to a higher level access path representation by performing the following operations:

Correlating multiple low-level events to determine a corresponding high-level state change. For example, a change event received from more than one source, for example, from switches 124 and 126 in an existing logical path, may indicate a new connection between two switches which represents a high level state change. Another example of a high level state is a zoning change in a switch fabric which may involve several low-level state changes in several switches in the fabric.

Correlating multiple low-level events to identify redundant information about the same state change and deleting duplicative low level event information. For example, a device failure represents a high level state change which may result in one or more redundant messages from devices in addition to the time-out message from the failed device itself.

Correlating multiple low-level events to obtain additional complementary information about a high-level event. For example, correlating between a host WWN identifier and its IP identifier may lead to additional information regarding a state change associated with that host.

Correlating multiple low-level events to determine conflicting information relating to the same state change, and attempting to resolve the identified conflict based on consistency of information from different sources and known reliability of the components. For example, when a new switch or a new host is added to a switch fabric, some neighboring devices may detect and report this event, while others may be updated later and hence still provide outdated state information.

Correlating multiple low-level events with information about a previously planned change in the network fabric. For example, one or more low-level component events, such as events received from a switch, may initially indicate a component failure, such as a disabled connection on one of the switch ports may indicate. However, when the same information correlated with the planned change information, the failure may be diagnosed as being most likely due to a change in cabling as part of a planned migration task.

Correlating multiple low-level events with a network-specific access path policy. For example, the network-specific access path policy may require dual fabric redundancy, so that a new low-level component event may indicate a new cable connection between a server and a storage device as part of a redundant path being set up.

Establishing the impact of network state changes on the access paths and the access path attributes. For example, a zoning change or a LUN-masking change may imply that one or more new end-to-end (application/hosts to data/LUNs) access paths are established, or that one or more access paths cease to exist.

The above process defines a consistent event sequence of component state changes and their impact on the end-to-end access paths. This can be represented and visualized as a consistent access path event history in the network.

The consistent access path event history is used as a basis for various analysis tasks and to provide control, diagnostics, management, and audit functions. For example, the management server may record every time-stamped low level component event and store it in a dedicated repository. The server can determine from the event sequence of the low level component events corresponding high level access paths and compare the access path with the access path policy. The management server may also record the derived higher level access paths state changes in the repository. In addition, the management server may store the access path policy and changes to the access path policy of the network or of at least the part of the network managed by the management server.

Access path violations may occur for a variety of reasons, including planning mistakes, component failures, and human errors. One challenge addressed by the process of the invention is to identify the root cause of an access path violation. A root cause is defined as an event in the network fabric that causes a violation of access path policy, without being itself caused by an earlier, correctly time-stamped event that violated the access path policy. Whenever an access path violation is detected, effective corrective actions can be performed once the root cause is established.

Whenever the management server detects an access path violation, for example, caused by a component event, the server determines whether the access path was ever set-up correctly, i.e., did not have a preceding violation. If the access path had been set-up correctly, then at least the subset of access paths associated with the access path event history of that path is examined, and the earliest state change in the event sequence from a state without a violation to a state with a violation is identified as the root cause. The state change is presented, for example displayed on display 14, with its context information, including the corresponding low-level component events. Determining the appropriate corrective action is described below. In most situations, i.e. in the absence of consequential components events that lead to failure of another device, or of other unrelated component events, remedying the root cause will cure the access path violation due to the root cause.

If, on the other hand, the access path associated with the violation was not set up correctly (for example, because access path is just being constructed in conjunction with a specific policy update event), then the root cause of the violation may be due to one or more "missing state changes." Identifying these missing state changes is performed as part of the corrective action analysis.

The process of establishing the appropriate corrective actions for a given violation is performed by a combination of several approaches. For certain types of the root cause events and violations, a corresponding counter-event mapping is pre-defined. In general, a graph-analysis is performed to determine the optimal route (or change state sequences) which will lead from the current access path state (which includes the violation) to the target state (as specified by the corresponding policy). This analysis can also be supported by a knowledge-base representing pre-defined network procedures that can provide helpful hints and suggestions to users in cases where no single final determination about the best corrective action can be derived.

Figure 4:
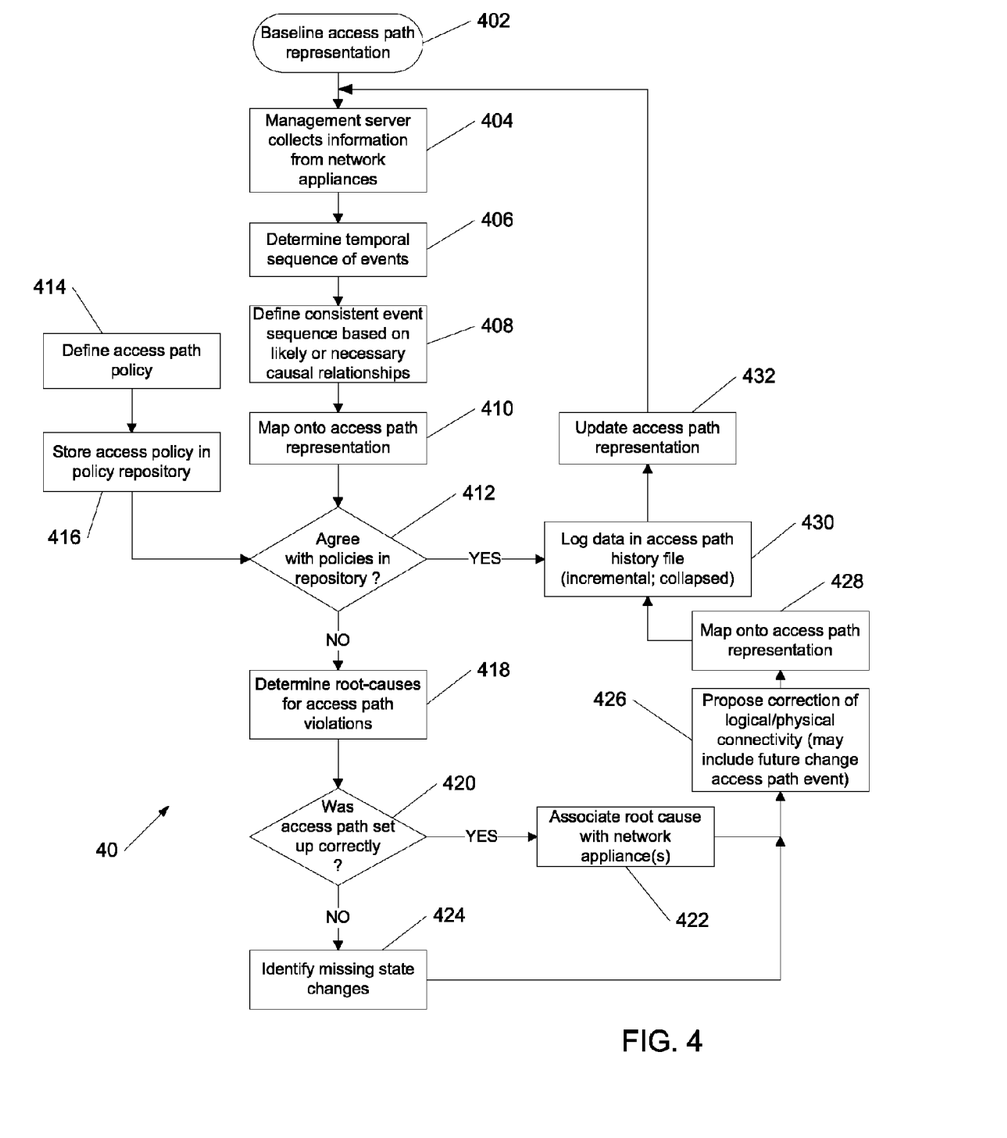
FIG. 4 is a schematic high-level flow diagram for constructing and analyzing an access path event history.

The aforedescribed process for constructing and analyzing the access path history in a network is summarized in FIG. 4. The process 40 starts with a network state where all network appliances are communicating via valid physical and logical access paths that conform to the defined access path policy for that network or section of network, step 402. The management server 12 collects information from the network appliances, either continuously or periodically, as described above, enabling the server to identify one or more component events, step 404. The server then attempts to determine a temporal sequence of the component events based, for example, on timestamps of these events, step 406. However, since a single component event, such as a component fault or a configuration change, can cause multiple events to be indicated to the server 12, which are a consequence of the first event without representing in themselves a component malfunction, the temporal sequence is analyzed and transformed into a consistent event sequence based on likely or necessary causal relationships between the individual events, step 408, and mapped onto a logical access path representation, step 410, which can be visualized on monitor 14.

The access paths are then compared 412 with the defined access path policy 414 which can be stored 416 in a policy repository. If the logical access paths comply with the access path policy, no action is required, and the event is logged in an access path history file, step 430, the access path representation is updated, if necessary, step 432, and the server 12 continues to monitor the network.

Conversely, if the logical access paths do not comply with the access path policy, then the root cause for the access path violation(s) is determined, step 418, based, for example, on the consistent event sequence determined in step 408. It is first determined in step 420, if the access path was set up correctly, because the root cause event can also be triggered, for example, by a component change which complies with a presumably correct access path that was, however, set up incorrectly. In this case, the missing or incorrect state change is identified, step 424, and changes in the logical/physical connectivity are proposed, step 426. If, on the other hand, the access path was set up correctly, as determined in step 420, then the earliest component event (root cause) identified in step 418 is assumed to have been the trigger event, step 422, and the component is repaired or the physical connection redefined and/or rerouted, step 426, and the resulting logical path is validated and mapped onto the access path representation. The changes are then logged, step 430, and the access path representation updated, step 432, as described before.

The mechanisms for analyzing and correcting root cause violations are applicable to "actual violations" as well as "pending violations." Actual violations reflect events that have already occurred in the network environment. Pending violations reflect planned state change events which have not yet been performed in the network environment. As both these events are similarly represented in the state change history structure (with past timestamps and future timestamps, respectively), the analysis mechanisms for both these cases can be constructed in an analogous manner. A process for simulating and executing planned changes in a network are described, for example, in the concurrently filed US patent application titled "Methods and systems for predictive change management of logical end-to-end access paths in storage area networks" by the same inventors.

As the data structure which includes the incremental component events and the incremental access path changes may grow rapidly, the low level event sequences may be collapsed into a new global state representation after violations of the access path policy have been rectified and/or changes to the access path policy have been implemented. Each such global state is a representation of the network at a specific point in time and can be viewed graphically. Each collapsed global state representation is computed by starting from the last collapsed state and applying sequentially each new state change. Zoom-in and zoom-out capabilities, aided by graphic visualization, enable to view details of low-level events, corresponding higher level state changes, affected access paths, and/or the corresponding network state representation.

A variety of filtering and query capabilities enable selection and presentation of subsets of the history and subsets of the network, according to any selection criteria. Indexing structures enable selection, for example, of all the state changes within a certain time interval, affecting a specific component, or impacting certain access paths, and others. Moreover, comprehensive summary statistics on either network states or on the change processes themselves can be prepared.

While the invention has been disclosed in connection with the preferred embodiments shown and described in detail, various modifications and improvements may be made thereto without departing from the spirit and scope of the invention. By way of example, although the illustrative embodiments are depicted with reference to a storage area network (SAN), this need not be the case. Instead other networks with defined access paths may employ the method of the invention, and the network fabric may include any type of device that provides the described access constraints between network appliances. Accordingly, the spirit and scope of the present invention is to be limited only by the following claims.

What is claimed is:

1. A process for constructing and analyzing an access path event history in a network, comprising:
   detecting at least one access path event causing nonconformance with an access path policy, wherein an access path event comprises a physical or a logical change of a state of a network component on the access path, and the access path policy includes a set of access paths and attributes of the set of access paths;
   determining a root cause of the nonconformance, wherein determining the root cause includes determining event timing of the at least one access path event, and reconciling discrepancies in the event timing of the at least one access path event, wherein determining the event timing includes receiving, at a network management device, electronic signals representative of timestamps from network components, the timestamps being associated with the at least one event, wherein reconciling discrepancies in the event timing is based on a route for transmission of a timestamp, a multiplicity of messages with different timestamps for an identical event, and a causal relationship between events;
   reconfiguring network resources based on the root cause to bring the reconfigured network in conformance with the access path policy; and
   validating the reconfigured network.

2. The process of claim 1, wherein reconciling discrepancies includes correcting, or proposing corrective action for, logical/physical path connectivity of the network components to bring the reconfigured network in conformance with the access path policy.

3. The process of claim 1, wherein detecting an event includes obtaining physical and logical state parameters from the components.

4. The process of claim 1, further comprising successively recording events and associated root causes for the nonconformance.

5. The process of claim 4, further comprising collapsing the successively recorded events into an updated access path representation.

6. The process of claim 5, further comprising visualizing the collapsed access path representation.

7. The process of claim 4, further comprising visualizing the recorded events.

8. The process of claim 1, further including selecting one or more subsets of the recorded events or of the network, or both, for providing a summary statistics of the events or a network status.

9. The process of claim 1, further including filtering the events so as to record state changes within a certain time interval, state changes affecting a specific component, state changes impacting certain access paths, or a combination thereof.

10. The process of claim 1, wherein the network component includes at least one of a server computer, a storage device, and a physical network switch.

11. A process for constructing and analyzing an access path event history in a network, comprising:
    detecting nonconformance between an access path state and an access path policy based at least in part on determining a logical order and a temporal order for the access path event history, wherein the logical order comprises at least one of likely causal relationships and necessary causal relationships between the access path events in the access path history, the temporal order comprises a time order of occurrence of the access path events, and wherein the logical order and the temporal order determine a sequence of multiple component events in the order in which the events actually occur in the network;

determining at least one future change access path event which, if it occurs, will result in conformance of network access paths with the access path policy, wherein the future change access path event comprises a physical or a logical change of a state of a component on an access path;

receiving, at a network management device, an electronic signal indicative of the occurrence of the at least one future change access path event; and validating the conformance of the access paths after the change events have occurred based on the received electronic signal.

12. The process of claim 11, wherein the component on the access path includes at least one of a server computer, a storage device, and a physical network switch.

* * * * *